(12) United States Patent
Le Dily et al.

(10) Patent No.: US 9,274,538 B2
(45) Date of Patent: Mar. 1, 2016

(54) VOLTAGE SCALING SYSTEM

(71) Applicant: Atmel Corporation, San Jose, CA (US)

(72) Inventors: Mickael Le Dily, Carquefou (FR); Moise Carcaud, Sainte Luce sur Loire (FR)

(73) Assignee: ATMEL Corporation, San Jose, CA (US)

( * ) Notice: Subject to any disclaimer, the term of this patent is extended or adjusted under 35 U.S.C. 154(b) by 0 days.

(21) Appl. No.: 14/042,303

(22) Filed: Sep. 30, 2013

(65) Prior Publication Data

US 2014/0055105 A1   Feb. 27, 2014

Related U.S. Application Data

(62) Division of application No. 13/592,173, filed on Aug. 22, 2012, now Pat. No. 8,575,997.

(51) Int. Cl.
*G05F 1/10* (2006.01)
*G05F 1/613* (2006.01)
*G06F 1/32* (2006.01)

(52) U.S. Cl.
CPC ............. *G05F 1/613* (2013.01); *G06F 1/3296* (2013.01); *Y02B 60/1285* (2013.01)

(58) Field of Classification Search
CPC ........... G05F 1/56; G05F 1/465; G05F 1/613; G11C 5/147; G06F 1/3296; Y02B 60/1285
USPC ......... 327/530, 538, 540, 541, 543, 560, 561, 327/562, 563, 77, 78, 79, 87, 88, 89; 323/223, 234, 266, 268, 267, 269, 271, 323/272, 282, 283, 284, 285, 293, 349, 350, 323/351
See application file for complete search history.

(56) References Cited

U.S. PATENT DOCUMENTS

| | | | |
|---|---|---|---|
| 5,337,284 A | 8/1994 | Cordoba et al. | |
| 5,471,432 A | 11/1995 | Makihara | |
| 5,568,083 A | 10/1996 | Uchiyama et al. | |
| 5,936,455 A * | 8/1999 | Kobayashi et al. | ........... 327/437 |
| 6,175,531 B1 | 1/2001 | Buck et al. | |
| 6,195,298 B1 | 2/2001 | Furutani et al. | |
| 6,348,833 B1 | 2/2002 | Tsujimoto et al. | |

(Continued)

OTHER PUBLICATIONS

U.S. Appl. No. 13/592,173, filed Aug. 22, 2012, 12 pgs.

(Continued)

*Primary Examiner* — Jung Kim
(74) *Attorney, Agent, or Firm* — Fish & Richardson P.C.

(57) ABSTRACT

A circuit for downscaling voltage comprising: a voltage regulator; a voltage reference register configured to provide a voltage reference value; a voltage comparator configured to output a logical one if a supply voltage of the voltage regulator is greater than the voltage reference value, wherein a first input of the voltage comparator is coupled to output of the voltage regulator and a second input of the voltage comparator is coupled to output of the voltage reference register; an AND gate, where a first input of the AND gate is coupled to output of the voltage comparator and a second input of the AND gate is coupled to a voltage reference ready signal; a switch configured to close based on output of logical one from the AND gate; and a pull-down resistor configured to couple to the output of the voltage regulator only if the switch is closed.

10 Claims, 3 Drawing Sheets

(56) References Cited

U.S. PATENT DOCUMENTS

| | | | |
|---|---|---|---|
| 6,457,082 B1* | 9/2002 | Zhang | G06F 1/3203 710/260 |
| 6,956,429 B1 | 10/2005 | Elbanhawy | |
| 7,755,410 B2 | 7/2010 | Oh et al. | |
| 8,575,997 B1* | 11/2013 | Le Dily | G05F 1/613 323/266 |
| 2002/0126561 A1 | 9/2002 | Rooparvar | |
| 2003/0210026 A1 | 11/2003 | Clark | |
| 2004/0181643 A1 | 9/2004 | Micheloni et al. | |
| 2005/0218871 A1 | 10/2005 | Kang et al. | |
| 2005/0223259 A1 | 10/2005 | Lehwalder et al. | |
| 2007/0115044 A1 | 5/2007 | Chan et al. | |
| 2007/0274148 A1 | 11/2007 | Nitta et al. | |
| 2008/0049505 A1 | 2/2008 | Kim et al. | |
| 2008/0067998 A1 | 3/2008 | Lee et al. | |
| 2011/0157976 A1 | 6/2011 | Kuriyama | |
| 2011/0235457 A1 | 9/2011 | Hirata | |
| 2013/0166934 A1 | 6/2013 | Chu | |

OTHER PUBLICATIONS

U.S. Appl. No. 13/592,173, Restriction Requirement mailed May 9, 2013.

U.S. Appl. No. 13/592,173, Notice of Allowance mailed Jul. 2, 2013.

U.S. Appl. No. 13/614,467, Non-Final OA, dated Dec. 23, 2014, 14 pages.

U.S. Appl. No. 13/614,468, Non-Final OA dated Apr. 20, 2015.

* cited by examiner

VOLTAGE SCALING SYSTEM

CROSS-REFERENCE TO RELATED APPLICATIONS

This application is a divisional of and claims priority to U.S. application Ser. No. 13/592,173, filed Aug. 22, 2012, the entire disclosure of which is incorporated by reference.

TECHNICAL FIELD

This disclosure relates generally to electronics and more particularly to voltage scaling systems.

BACKGROUND

A system can use a voltage regulator to scale supply voltages. The voltage regulator maintains a constant voltage level until instructed to supply a different voltage level. Generally, transitioning from a voltage value to a lower voltage value can take a significantly longer time than transitioning from the voltage value to a higher voltage value.

By decreasing supply voltages, the system can achieve lower power consumption. When the system dynamically decreases a supply voltage, certain operations should be halted until the supply voltage is stabilized. For example, Flash memory data fetches should be halted until the data is recalibrated with the updated voltage supply value. The time required to stabilize the voltage is generally unpredictable and can have a negative impact on system latency.

SUMMARY

A voltage scaling system can upscale or downscale a supply voltage. The voltage scaling system determines whether to upscale or downscale the supply voltage based on a received instruction, e.g., from embedded software or hardware. When downscaling the supply voltage to a target voltage, the voltage scaling system closes a switch that couples output of a voltage regulator to a pull-down resistor. The pull-down resistor quickly downscales the supply voltage to the target supply voltage and then is disconnected. When upscaling the supply voltage, the pull-down resistor is not used.

Particular implementations of the voltage scaling system can provide one or more of the following advantages: 1) the voltage scaling system can quickly downscale a supply voltage to a target supply voltage; 2) the voltage scaling system decreases latency of system operation by more quickly stabilizing the supply voltage; and 3) the voltage scaling system quickly downscales the supply voltage without damaging the system.

The details of one or more disclosed implementations are set forth in the accompanying drawings and the description below. Other features, aspects, and advantages will become apparent from the description, the drawings and the claims.

DETAILED DESCRIPTION

Example Voltage Scaling System

Figure 1:
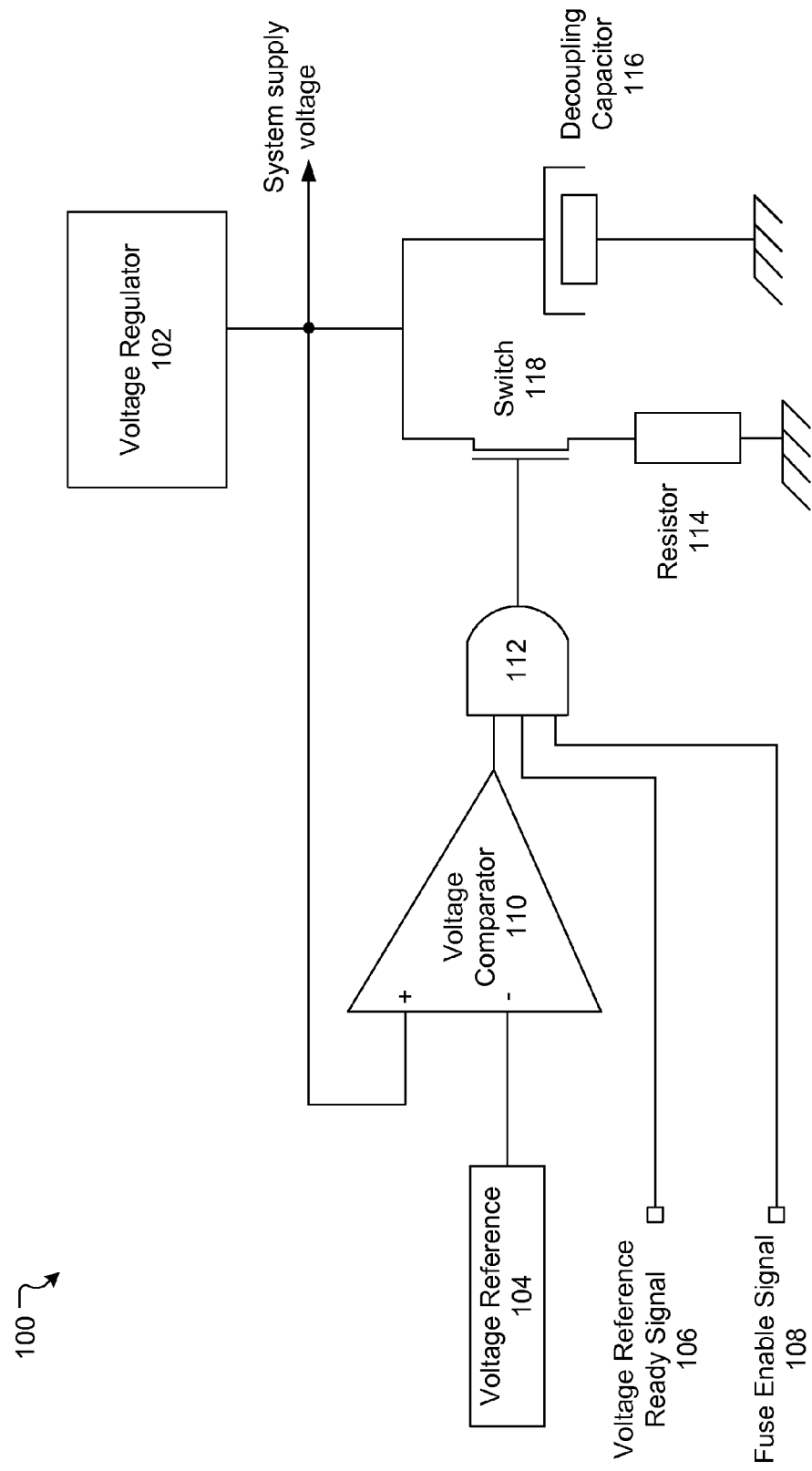
FIG. 1 is a schematic diagram of an example voltage scaling system.

FIG. 1 is a schematic diagram of an example voltage scaling system 100. The voltage scaling system 100 includes a voltage regulator 102. The voltage regulator 102 provides a system supply voltage to the voltage scaling system 100. In some implementations, the voltage regulator 102 also provides the supply voltage to other systems coupled to the system supply voltage, e.g., a third party system. The voltage regulator 102 can adjust the system supply voltage upon receiving an instruction, e.g., from the third party chip.

The voltage scaling system 100 includes a decoupling capacitor 116. The decoupling capacitor 116 is coupled to output of the voltage regulator 102 and leads to ground. The decoupling capacitor 116 stabilizes the system supply voltage used to power one or more systems coupled to output of the voltage regulator 102.

The voltage scaling system includes a voltage reference 104. The voltage reference 104 provides a target supply voltage, e.g., can be controlled via a user register. In some implementations, the voltage reference 104 is established through a user interface. To downscale or upscale the system supply voltage, a user can assign, e.g., using the user interface that sends an instruction, a target supply voltage to the voltage reference 104. The voltage reference 104 has a very low latency compared to the rest of the system and can change reference values instantaneously. The voltage reference 104 enables a voltage reference ready signal 106 when the target supply voltage is ready to be obtained from the voltage reference 104.

The voltage scaling system 100 includes a voltage comparator 110. A first input of the voltage comparator 110 is coupled to the output of the voltage regulator 102. A second input to the voltage comparator 110 is coupled to the voltage reference 104. That is, the first input is the value of the system supply voltage and the second input is the value of the target supply voltage. The voltage comparator 110 compares the system supply voltage value to the target supply voltage value. If the system supply voltage is higher than the target supply voltage, the voltage comparator 110 outputs a logical one. Otherwise, the voltage comparator 110 outputs a logical zero.

The voltage scaling system 100 includes an AND gate 112. Output of the voltage comparator 110, e.g., a logical zero or logical one, is coupled to a first input of the AND gate. The voltage reference ready signal 106 is coupled to a second input of the AND gate.

In some implementations, the AND gate 112 receives a third input from a fuse enable signal 108. The fuse enable signal 108 can be enabled or disabled by a user, e.g., by setting or clearing a system fuse. The fuse enable signal 108 allows the user to activate or deactivate the switch, thereby respectively activating or deactivating the quick downscaling mechanism of the voltage scaling system.

Output of the AND gate toggles a switch 118. If the AND gate 112 outputs a logical one, the switch 118 is closed. Otherwise, if the AND gate 112 outputs a logical zero, the switch 118 is opened. Example operations of the switch 118 are described further below in reference FIG. 2.

If the switch is closed, the output of the voltage regulator 102 is coupled not only to the decoupling capacitor 116 as described above but also to a pull-down resistor 114. The pull-down resistor 114 and decoupling capacitor 116 are coupled in parallel with each other. By closing the switch, the voltage scaling system quickly downscales the system supply voltage to the target supply voltage by discharging current through the resistor 114. If the switch is open, the output of the voltage regulator 102 is coupled to the decoupling capacitor 116 but not to the resistor 114. In some implementations, the pull-down resistor 114 has a resistance large enough to not damage the voltage scaling system or other systems, e.g., by pulling too much current. For example, the pull-down resistor 114 can have a resistance of greater than 100 Ohms.

Example Voltage Scaling System Flowchart

Figure 2:
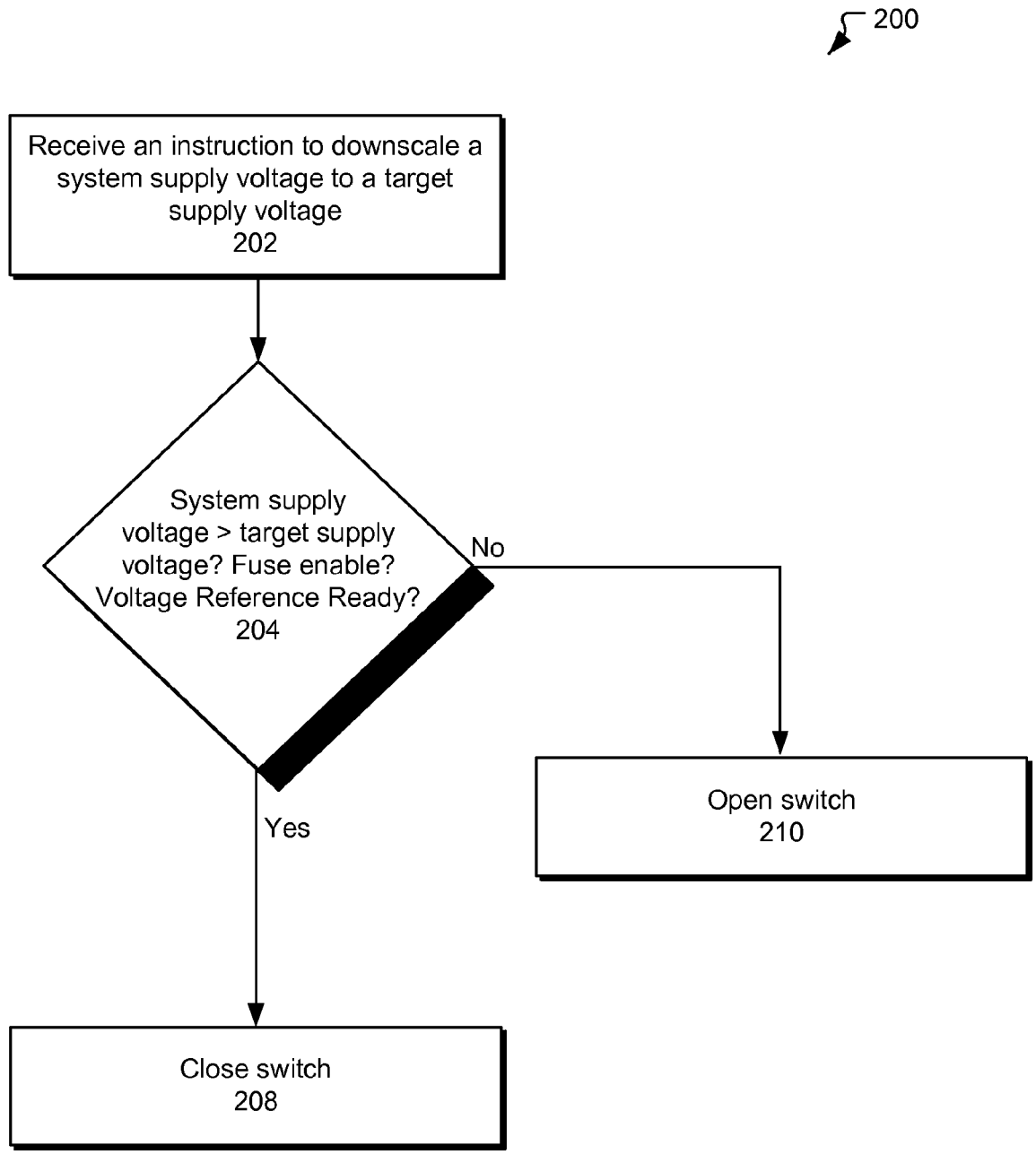
FIG. 2 is a flow diagram of an example process performed by a voltage scaling system.

FIG. 2 is a flow diagram 200 of an example process performed by a voltage scaling system, e.g., the voltage scaling system described above in reference to FIG. 1. The voltage scaling system can receive instructions to downscale or upscale voltage using a voltage regulator 102.

A voltage regulator 102 can output a stable system supply voltage. The voltage scaling system can receive an instruction to downscale the system supply voltage to a lower target supply voltage (step 202). The instruction can be sent by a system coupled to the system supply voltage. In some implementations, the instruction includes the target supply voltage value. Upon receiving the instruction, the system establishes the target supply voltage at a voltage reference 104, e.g., a user register. The voltage reference 104 sets a voltage reference ready signal 106 to high when the target supply voltage is ready to be compared.

As described above, the AND gate 112 considers up to three inputs: 1) output from a voltage comparator 110, 2) a voltage reference ready signal 106, and 3) a fuse enable signal 108. The voltage comparator 110 detects the target supply voltage is lower than the system supply voltage and therefore outputs a logical one. If the voltage comparator 110 outputs a logical one, the voltage reference ready signal 106 is a logical one, e.g., the voltage reference value is ready to be compared, and, if applicable, the fuse enable signal is a logical one (step 204), the AND gate 112 outputs a logical one, thereby closing the switch 118 (step 208).

When the switch is closed, output of the voltage regulator 102 is coupled to a pull-down resistor 114 and a decoupling capacitor 116 as described above in reference to FIG. 1. Current flows through the resistor 114 to ground, thereby quickly discharging the system supply voltage. The discharge time can be directly proportional to the resistance and capacitance of the pull-down resistor 114 and decoupling capacitor 116, respectively.

Once the system supply voltage downscales and reaches the target supply voltage, the target supply voltage is no longer lower than the system supply voltage, and the comparator outputs a logical zero instead of a logical one. As a result, the AND gate 112 outputs a logical zero and opens the switch 118 (step 210). When the switch 118 is open, current no longer flows through the resistor 114.

On the other hand, the voltage scaling system can receive an instruction to upscale the system supply voltage to a higher target supply voltage. Similar to the action described above, the system establishes the target supply voltage at the voltage reference 104. However, because the target supply voltage is larger than the system supply voltage, the voltage comparator 110 outputs a logical zero, causing the AND gate 112 to output a logical zero, and thereby opening the switch 118. The pull down resistor 114 is not used.

Example Graph of Supply Voltage vs. Time

Figure 3:
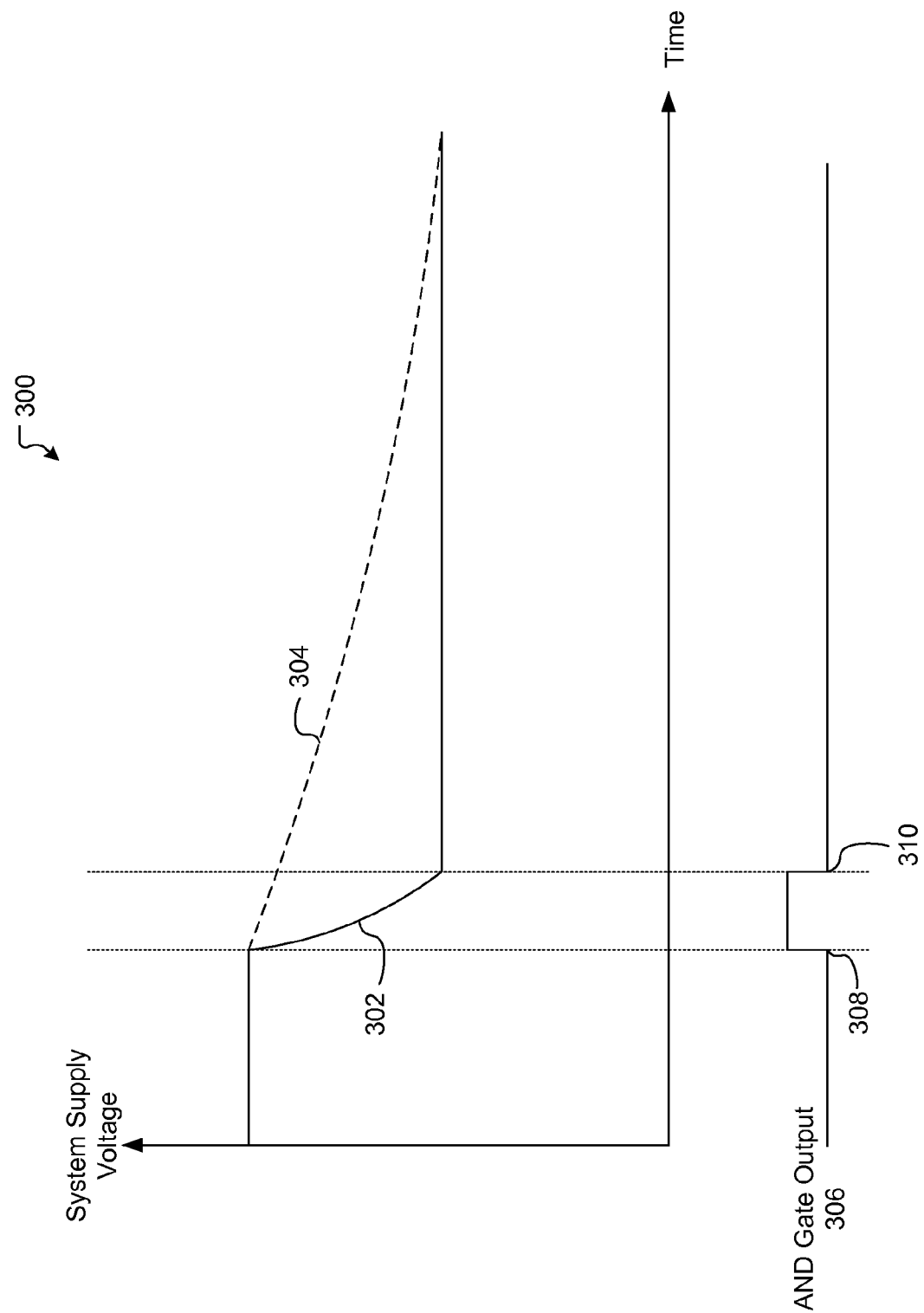
FIG. 3 is an example graph of a system supply voltage over time while the voltage scaling system is downscaling.

FIG. 3 is an example graph 300 of a system supply voltage over time while the voltage scaling system is downscaling. Curve 304 shows the system supply voltage gradually downscaling over time with the voltage scaling system deactivated. The curve 304 reaches a target supply voltage but the system requires time for the system supply voltage to gradually stabilize at the target supply voltage.

On the other hand, curve 302 shows the system supply voltage quickly downscaling, e.g., asymptotically, and stabilizing to a target supply voltage by using the voltage scaling system. As output of the AND gate 306 is high, a switch is closed, e.g., the switch described above in reference to FIG. 1. When the switch is closed, the system supply voltage downscales at a fast rate by discharging current through a resistor. The system supply voltage can downscale from when the switch closes at time 308 until a time 310 when the switch opens.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A method performed by a circuit for downscaling voltage, the method comprising:
   receiving a voltage ready signal indicating that a target supply voltage is ready for a comparison;
   generating a first logical output based on a first comparison between an output of a voltage regulator and the target supply voltage;
   generating a second logical output based on a second comparison between the first logical output and the voltage ready signal; and
   toggling a switch in accordance with the second logical output, wherein the switch, in a closed position, couples the output of the voltage regulator to a pull-down resistor, the switch and the pull-down resistor configured to downscale a system supply voltage to the target supply voltage.

2. The method of claim 1,
   wherein responsive to the voltage ready signal being high and the first logical output being high, the switch is closed.

3. The method of claim 2, further comprising receiving a fuse enable signal and toggling the switch based on a third logical output based on the first logical output, the voltage ready signal and the fuse enable signal.

4. The method of claim 3, wherein the fuse enable signal is configured by a user.

5. The method of claim 2, wherein the first comparison is performed by a voltage comparator and the second comparison is performed by a logic device.

6. The method of claim 1, wherein the output of the voltage regulator is coupled to a decoupling capacitor.

7. The method of claim 3, wherein responsive to the fuse enable signal being high, the switch is closed.

8. The method of claim 1, further comprising
providing the target supply voltage by a voltage reference, wherein the voltage reference is configured by a user.

9. The method of claim 8, wherein the voltage reference is low latency compared to the circuit.

10. The method of claim 1, further comprising:
providing the output of the voltage regulator as a system supply voltage to one or more systems.

\* \* \* \* \*